(12) United States Patent
Desserouer

(10) Patent No.: US 8,520,204 B2
(45) Date of Patent: Aug. 27, 2013

(54) DYSON-TYPE IMAGING SPECTROMETER HAVING IMPROVED IMAGE QUALITY AND LOW DISTORTION

(75) Inventor: Frederic Desserouer, Palaiseau (FR)

(73) Assignee: Horiba Jobin Yvon SAS, Longjumeau (FR)

( * ) Notice: Subject to any disclaimer, the term of this patent is extended or adjusted under 35 U.S.C. 154(b) by 173 days.

(21) Appl. No.: 13/127,354

(22) PCT Filed: Nov. 2, 2009

(86) PCT No.: PCT/FR2009/052114
§ 371 (c)(1),
(2), (4) Date: May 3, 2011

(87) PCT Pub. No.: WO2010/061090
PCT Pub. Date: Jun. 3, 2010

(65) Prior Publication Data
US 2011/0222061 A1  Sep. 15, 2011

(30) Foreign Application Priority Data
Nov. 3, 2008  (FR) .................................. 08 57466

(51) Int. Cl.
*G01J 3/28* (2006.01)
(52) U.S. Cl.
USPC .......................................... 356/328; 356/326
(58) Field of Classification Search
USPC ................... 356/328, 326, 305, 334
See application file for complete search history.

(56) References Cited

U.S. PATENT DOCUMENTS 3,628,849 A  12/1971  Flamand et al.
4,087,183 A  5/1978  Passereau (Continued)

FOREIGN PATENT DOCUMENTS

| EP | 0 179 717 A1 | 4/1986 |
|----|---|---|
| EP | 0 862 050 A2 | 9/1998 |
| FR | 2 036 613 A | 12/1970 |
| FR | 2 334 947 A1 | 7/1977 |
| FR | 2 653 879 A1 | 5/1991 |

OTHER PUBLICATIONS

Warren D. W. et al.: "Dyson Spectrometers for high-performance infrared applications", Optical Engineering, vol. 47, No. 10, Oct. 14, 2008, pp. 103601-1-103601-9, XP002515406, abstract: figures 1, 4 paragraphs [0002]-[0005], [0007].

(Continued)

*Primary Examiner* — Layla Lauchman
(74) *Attorney, Agent, or Firm* — Young & Thompson

(57) ABSTRACT

A Dyson imaging spectrometer includes an entry port extending in a direction X, an exit port, a diffraction grating including a set of lines on a concave support, an optical system including a lens, the lens including a plane first face and a convex second face, the convex face of the lens and the concave face of the diffraction grating being concentric, the optical system being adapted to receive an incident light beam coming from the entry port and to direct it toward the diffraction grating, to receive a beam diffracted by the diffraction grating, and to form a spectral image of the diffracted beam in a plane of the exit port, the spectral image being adapted to be spatially resolved in an extension direction X' of the image of the entry port. The diffraction grating includes a set of non-parallel and non-equidistant lines and/or the support of diffraction grating is aspherical in order to form an image of the entry port in the exit plane of improved image quality and of very low distortion.

15 Claims, 7 Drawing Sheets

(56) References Cited

U.S. PATENT DOCUMENTS

| | | | |
|---|---|---|---|
| 4,842,353 A | 6/1989 | Thevenon | |
| 5,995,221 A * | 11/1999 | Slutter et al. | 356/326 |
| 6,181,418 B1 * | 1/2001 | Palumbo et al. | 356/328 |
| 6,266,140 B1 | 7/2001 | Xiang et al. | |
| 6,538,736 B1 * | 3/2003 | Palumbo | 356/326 |
| 7,330,258 B2 * | 2/2008 | Warren | 356/328 |
| 7,609,381 B2 * | 10/2009 | Warren | 356/328 |

OTHER PUBLICATIONS

Fink U. et al.: "Applications of Holographic Gratings to Two-Dimensional Spectroscopy", Applied Optics, OSA, Optical Society of America, Washington, DC, vol. 35, No. 7, Mar. 1, 1996, pp. 1047-1055, XP000586020, ISSN: 0003-6935.

International Search Report, dated Jan. 15, 2010, from corresponding PCT application.

* cited by examiner

Prior art
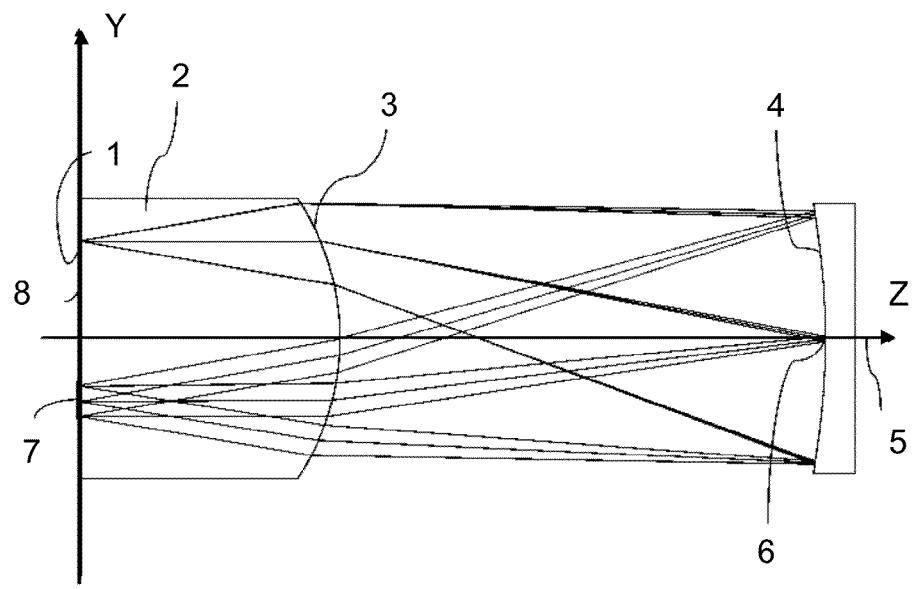
Figure 1
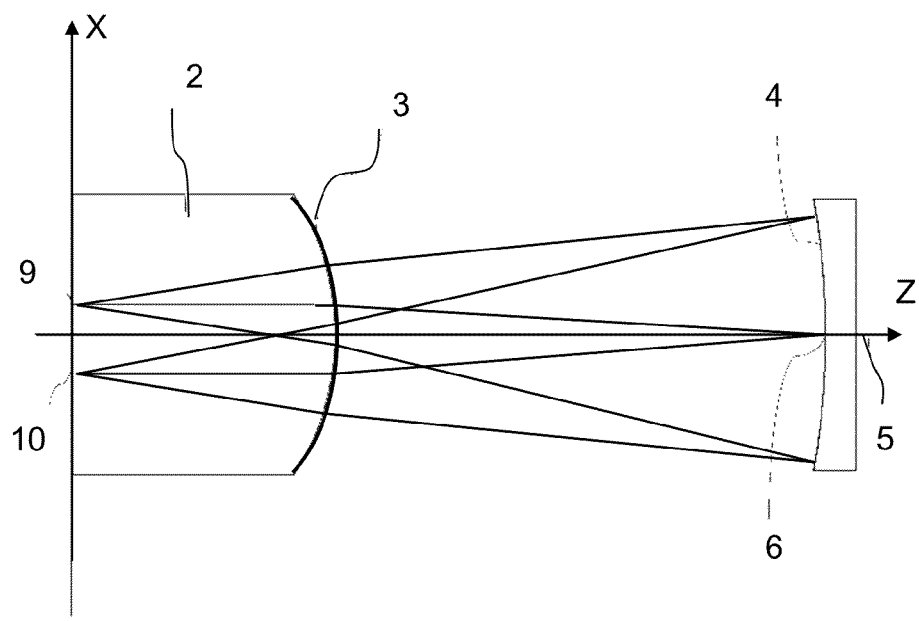
Prior art          Figure 2

DYSON-TYPE IMAGING SPECTROMETER HAVING IMPROVED IMAGE QUALITY AND LOW DISTORTION

The present invention relates to a Dyson imaging spectrometer having improved image quality for applications in the field of spectrometry and hyperspectral imaging.

In the present document, the expression "imaging spectrometer" refers to a spectrometer able to form an image of an entry slit resolved spatially along the height of that slit and resolved spectrally at each image point of that slit. Imaging spectrometers include in particular spectrometers for hyperspectral imaging and optical fiber spectrometers.

The invention relates more specifically to an improved imaging spectrometer for forming an image having high image quality throughout the image field and very low spatial and spectral distortion in order to obtain an image of high spectral and spatial resolution throughout the image field.

There exist numerous spectrometer optical systems. An imaging spectrometer usually comprises an entry slit, a dispersive element, which is generally a diffraction grating or a prism, and various optical elements (lenses or mirrors) for forming the image of the entry slit on a sensor device (mobile exit slit and sensor or linear or 2D sensor matrix).

Some fields of application of spectrometry require spectrometers that have specific imaging properties. An imaging spectrometer must have very good image quality not only in the spectral dimension (i.e. the conventional spectral resolution quality of a spectrometer) but also in the spatial dimension, i.e. good spatial resolution in the direction of the entry slit.

An imaging spectrometer must also have the following properties:
- a wide field, i.e. image quality that is preserved for great slit heights;
- a large numerical aperture, in order to capture the maximum light;
- low distortion (for an imaging spectrometer the distortion may be spectral and/or spatial).

A first field requiring such spectrometers is hyperspectral imaging in which what is of interest is no longer only the spectrum produced by the light entering through the whole of the entry slit but also the spectrum of each spatially distinct point along the entry slit. Hyperspectral imaging has recently been expanded by means of new matrix sensors of high performance, offering both very high sensitivity and very high resolution by means of elementary sensors (pixels) having a size of the order of a few micrometers. An optical device (generally a telescope) forms the image of the scene to be analyzed on the entry slit of the spectrometer and each spatial detail of the scene along the entry slit is then analyzed spectrally. The quality of the image produced by the spectrometer is therefore of primordial importance, both in the direction of the spectral dispersion that determines the capacity of the system to discriminate two close wavelengths and in the spatial direction that makes it possible to discriminate two very close object points (which thus corresponds to the detail of the image in the direction of the slit).

In one application example, a spectrometer for hyperspectral imaging is mounted on an aircraft or a satellite that moves over the land in a direction perpendicular to the entry slit. The scene is scanned by virtue of the movement of the entire spectrometer relative to the scene or by an imaging system in front of the spectrometer, the entry slit remaining fixed. To each position of the spectrometer or scanning system there corresponds an entry slit image column. From a set of image columns, the system is able to reconstitute an image of the whole scene at hundreds of different wavelengths (depending on the level of discreteness of the spectrum chosen for the analysis).

A second field of application relates to optical fiber spectrometers, in which the entry slit is replaced by a large number of aligned optical fibers forming an entry slit consisting of the juxtaposition of a multitude of small quasi-point sources. A fiber spectrometer makes it possible to perform spectral analysis of a very large number of samples (one sample per fiber) and to do so simultaneously (parallel analysis) using a single matrix sensor. A row of pixels or a group of rows of pixels analyzes the spectrum corresponding to the image of an entry optical fiber on the matrix sensor. It is then essential to provide an independent spectral analysis for each fiber. A fiber spectrometer must also have very good image quality and low distortion both in the spectral dimension and in the spatial dimension.

Known in the art is a type of imaging spectrometer having some of the required properties, namely reflective or refractive concentric spectrometers as described in the literature by Mertz (1977) and Thévenon (Patent FR 2 653 879). The entirely reflective spectrometer is based on an imaging system invented by Offner (1973), and that spectrometer is therefore commonly referred to as an Offner spectrometer. An Offner spectrometer comprises a convex diffraction grating and one or two concave mirrors (entry and exit) concentric with the diffraction grating. An Offner imaging spectrometer generally has good spectral resolution, good brightness, and low distortion. An Offner imaging spectrometer system is sometimes bulky, however, which means an additional cost if such a spectrometer is to be embarked onboard a satellite.

An imaging spectrometer comprising a refractive optical element is based on a system invented by Dyson (1959) and the associated spectrometer is therefore commonly referred to as a Dyson spectrometer. The Dyson spectrometer proposed by Mertz in 1977 in Applied Optics comprises a half-ball lens associated with a concave diffraction grating in a concentric system. That type of system is known to have a greater numerical aperture because it exploits the fact that the entry slit and the image plane are in or very close to the glass constituting the lens. Dyson spectrometers have the advantage of being compact. Dyson spectrometers have some drawbacks, however: the entry and the exit are generally placed on the entry face of the lens or in its immediate vicinity, which may be incompatible with the overall size of some sensors. In particular, cooled imaging sensors generally comprise a matrix of sensors placed in a cooled enclosure some distance to the rear of a window, so that the sensitive sensing surface can not be placed in the image plane of a conventional Dyson spectrometer.

The Patent EP 0 862 050 (Instruments SA) describes a Dyson spectrometer used to form the spectrum of an entry port at an exit port and comprising a plano-convex lens and a concave diffraction grating with parallel lines on a spherical support. According to the above document, the spectrometer is improved by placing the entry port and the exit port outside the meridian plane of the diffraction grating to reduce stray light, the entry and the exit remaining on the plane face of the lens. Document EP 0 862 050 also describes the use of two far-apart entry ports for forming two spectra on two separate sensors that are far apart in the exit plane. However, the above document does not describe the use of such a spectrometer for imaging. Moreover, the use of that spectrometer is not compatible with a cooled imaging sensor.

Other types of spectrometer also use a diffraction grating with no other reflective or refractive collimation and/or focusing optical system. In those spectrometers, the diffraction grating has the spectral dispersion function and the function of collecting the entry flux and/or focusing the exit flux. Those spectrometers may be used for imaging, but their image quality in the field is much lower and their distortion is high. In such a spectrometer, a diffraction grating having lines that are not parallel and equidistant or having support that is aspherical can make it possible to correct some aberrations. The Jobin Yvon company has developed special holographic gratings optimized for non-imaging spectrometers with no refractive optics. Thus Document FR 2 036 613 describes a spectroscope device comprising a "corrected" diffraction grating that forms a spectrum corrected for spherical aberration or a spectrum corrected for astigmatism at one wavelength. However, the site of the astigmatism of the spectrum is not a plane surface perpendicular to the axis of the grating. Under those conditions, even with a grating corrected for aberration, the image quality obtained over a plane matrix sensor is not very good.

Document FR 2 334 947 describes a plane field spectrometer having a diffraction grating that is corrected for 1st and 2nd order coma aberration and for astigmatism. However, the spectrometer described in FR 2 334 947 is not corrected for spherical aberration or for field aberration. Moreover, the exit field is plane, but in a plane that is inclined relative to the axis of the grating, which makes positioning the sensor more complicated.

The gratings described in Documents FR 2 036 613 and FR 2 334 947 are certainly corrected for aberration in the spectral dimension, but there is nothing to indicate that such diffraction gratings can simultaneously correct field aberrations in an imaging spatial direction.

The Jobin Yvon patent EP 0 179 717 describes a plane holographic grating intended to be used in a spectrometer with two concave mirrors having lines that are etched in a non-equidistant and non-parallel manner to enhance the image quality of the spectrometer. It is nevertheless a spectrometer with two concave mirrors, which is very bulky.

It is not standard practice to use a so-called "corrected" grating in a concentric spectrometer having a refractive optical system. Better image quality is generally expected of a spectrometer comprising a mirror-based optical system because of the absence of chromatic aberration. The optimization of a diffraction grating corresponds to additional degrees of freedom and is more complex to define in a Dyson spectrometer. Surprisingly, this optimization of the grating enables the invention not only to improve image quality but also to define more practical spectrometer configurations with more room for positioning the source and/or the sensor.

One object of the invention is to propose a compact imaging spectrometer having very good image quality and low distortion.

Another object of the invention is to provide an imaging spectrometer offering good image quality and greater flexibility for positioning the entry slit and/or the sensor, notably so as to be compatible with the use of cooled imaging sensors, which have a non-zero frontal distance.

Another object of the invention is to propose an imaging spectrometer of very high spectral and spatial resolution over a large image field.

The image quality of a spectrometer is evaluated by measuring the image spot of an object point via the spectrometer. This image quality is evaluated by measuring different image spots corresponding to different object points. In an imaging spectrometer image quality is generally evaluated at the center of the field and at points away from the axis, and at central and extreme wavelengths of the spectrum. A known method of evaluating the size of an image spot is the RMS method, which consists in numerically tracing a set of rays and numerically measuring the mean distance of the rays in the image plane relative to the image point via a perfect system. There exists software capable of simulating the numerical response of any optical system and of optimizing some of the parameters defining the optical components constituting it.

The present invention has the object of remedying the drawbacks of prior art systems and more particularly provides a Dyson imaging spectrometer comprising an entry port extending in a direction X in an object plane of the spectrometer, said entry port being adapted to emit an incident light beam, a diffraction grating comprising a set of lines on a concave support, an optical system comprising a lens, said lens comprising a plane first face and a convex second face, the convex face of the lens and the concave face of the diffraction grating being concentric, said optical system being adapted to receive the incident light beam and to direct it toward the diffraction grating, to receive a beam diffracted by the diffraction grating, and to form a spectral image of the diffracted beam, the spectral image lying in an image plane of the spectrometer, and an exit port in the image plane of the spectrometer adapted to receive an image of the entry port spatially resolved in a direction X' and spectrally resolved in a direction Y'.

According to the invention the diffraction grating comprises a set of non-parallel and non-equidistant lines and/or the support of the diffraction grating is aspherical in order to improve the image quality of the spectral image over the image field at the same time as minimizing spectral and field distortion.

In an imaging spectrometer of a first embodiment of the invention the diffraction grating comprises a set of non-parallel and/or non-equidistant lines adapted to form a spectral image in a plane field of improved image quality at the same time as maintaining low spectral and field distortion.

In one particular embodiment of the invention the concave surface of the diffraction grating is an aspherical surface of revolution.

The concave surface of the diffraction grating is advantageously an ellipsoidal surface of revolution.

In one embodiment of the invention the refractive optical system comprises a hemispherical lens and a plate with plane and parallel faces, said plate lying against the plane face of the lens and being disposed on the optical path of the incident beam between the entry port and the diffraction grating, the object plane of the spectrometer being situated on one face of the plate and the image plane of the spectrometer being separated from the lens by a gap.

The materials of the lens and the plate are advantageously chosen to compensate chromatic dispersion over the image field.

In another embodiment the lens is a thin plano-convex lens and the object and image planes of the spectrometer are separated from the plane face of the lens by a gap. The gap advantageously has an optical thickness typically less than or equal to 15% of the radius of curvature of the grating.

The imaging spectrometer advantageously comprises a matrix sensor disposed in the image plane to form a spectral image of the entry port. The imaging spectrometer advantageously comprises an enclosure comprising a sensor and a window, the sensitive surface of the sensor being placed behind said window and said enclosure being adapted to cool said sensor. The gap between the lens and the image plane makes it possible in particular to use a cooled sensor, which is often of larger overall size than a sensor that is not cooled.

In one particular embodiment the imaging spectrometer comprises a set of optical fibers having their ends aligned with an axis on the entry port and the sensor is adapted to form an image spectrum of each optical fiber.

The present invention also relates to features that emerge during the following description and that should be considered separately or in all technically-possible combinations.

This description is given by way of non-limiting example to explain how the invention may be put into effect and with reference to the appended drawings, in which:

FIG. 1 is a view in section in the plane y-z (meridian plane) of a conventional Dyson spectrometer operating in order −1, the entry and the exit spread spectrum being placed on (or very close to) the plane surface of the lens;

FIG. 2 is a view in section in the plane x-z of a conventional Dyson spectrometer operating in order −1, where the rays are traced for an object point placed at 10 millimeters (mm) in the x direction perpendicular to the diffraction plane; the object and image points are on respective opposite sides of the meridian (y-z) plane;

Figure 3:
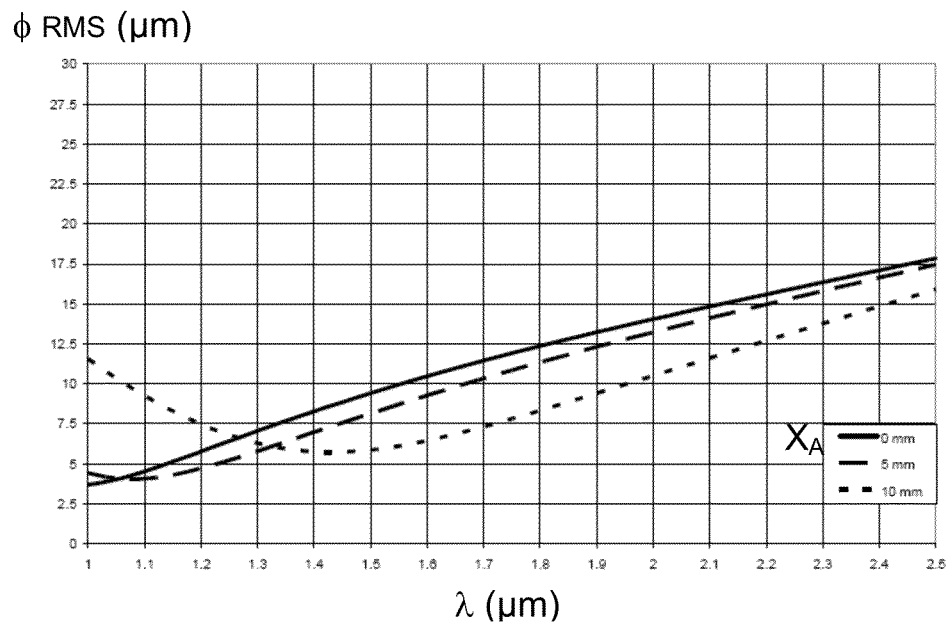
Figure 4:
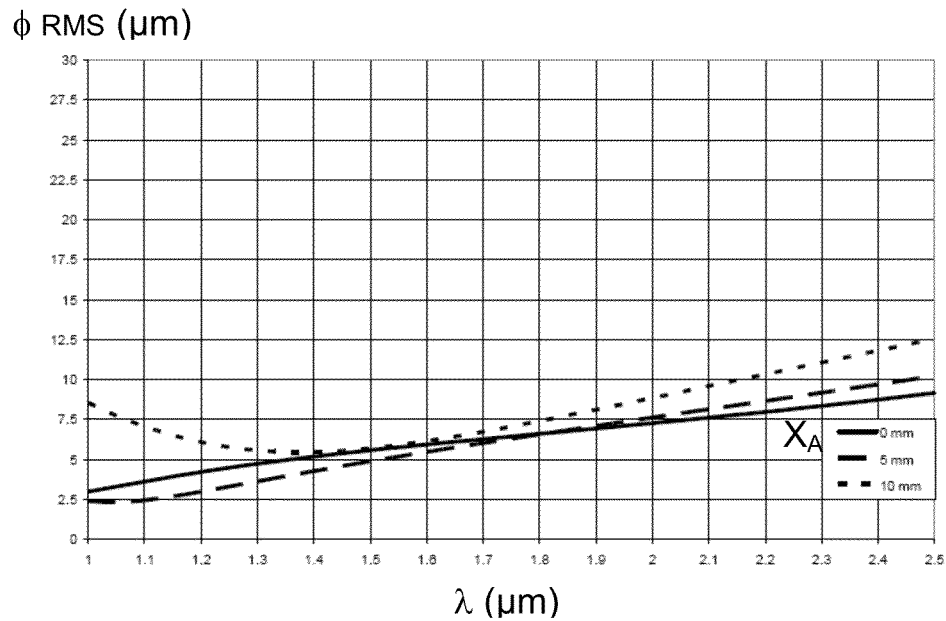
Figure 5:
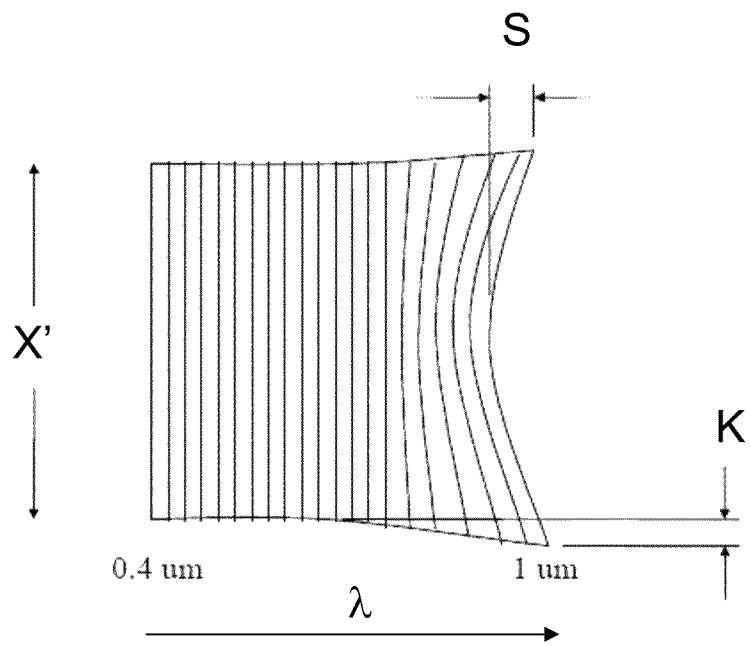
Figure 6:
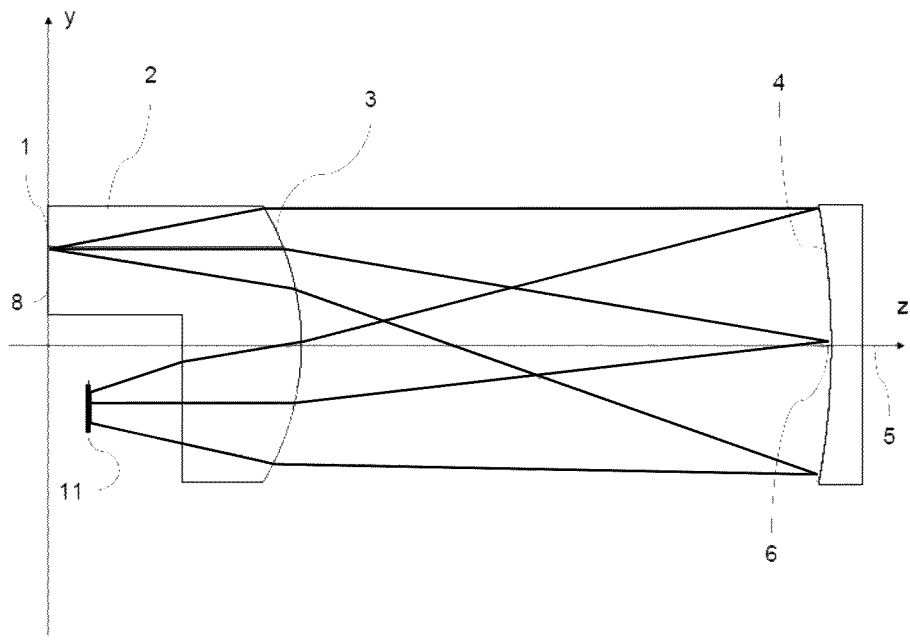
Figure 7:
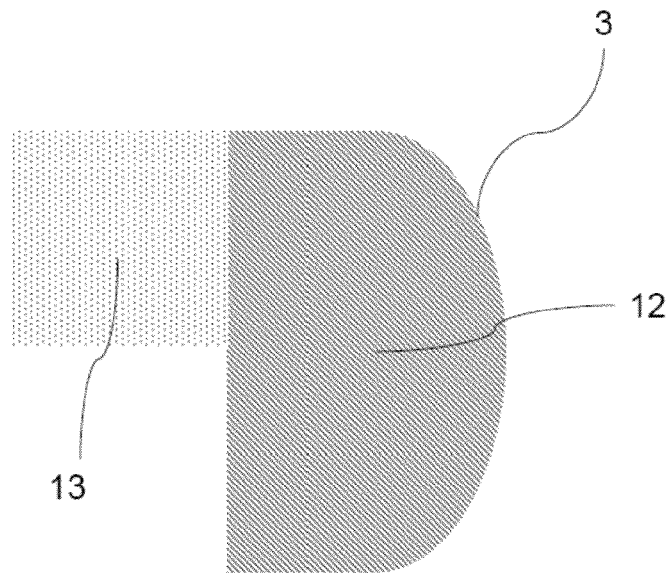
Figure 8:
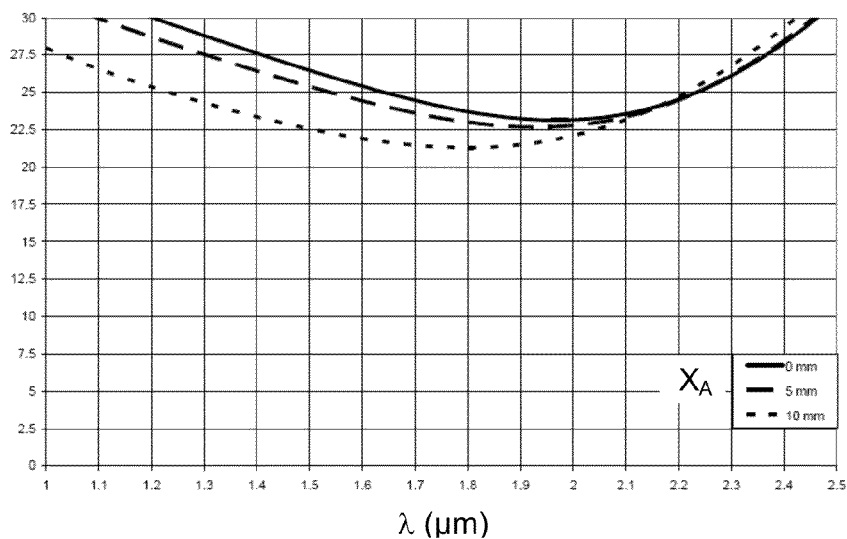
Figure 9:
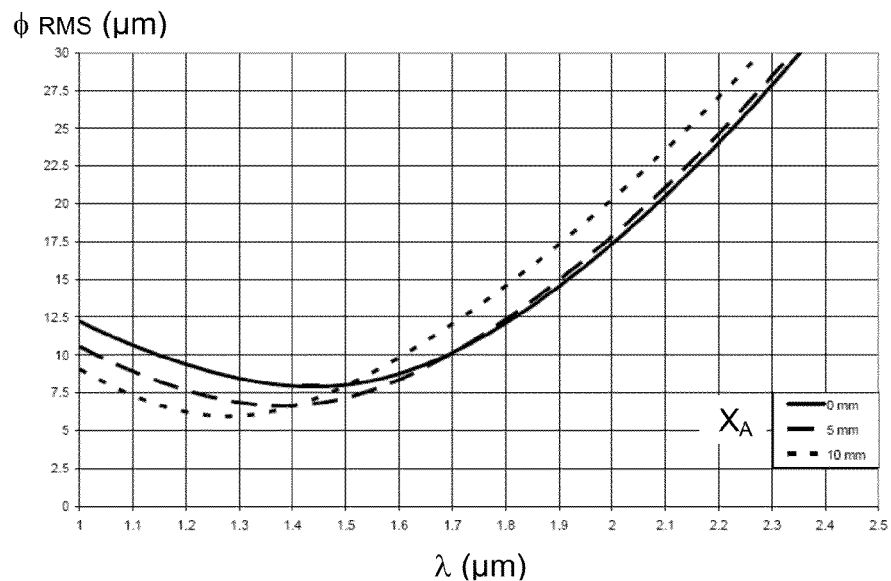
Figure 10:
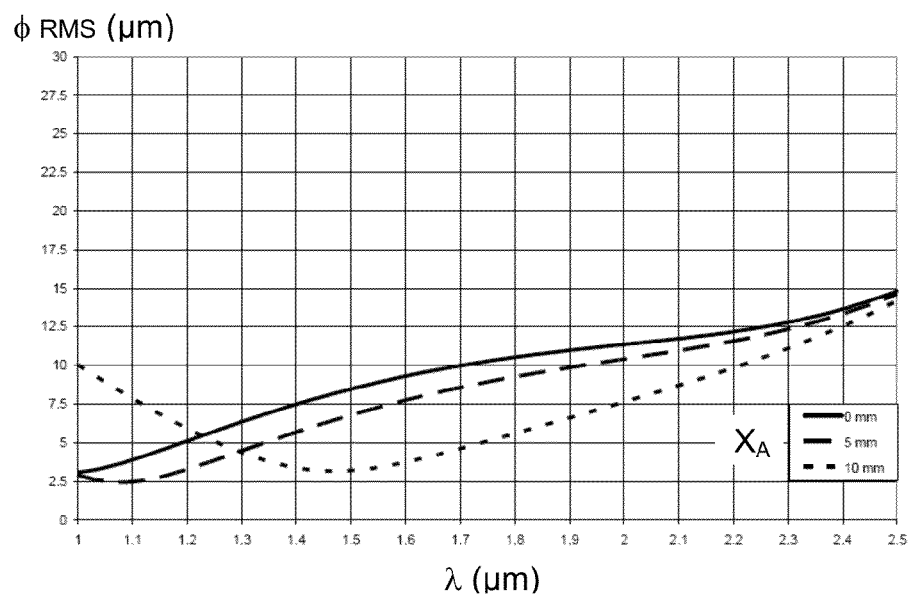
Figure 11:
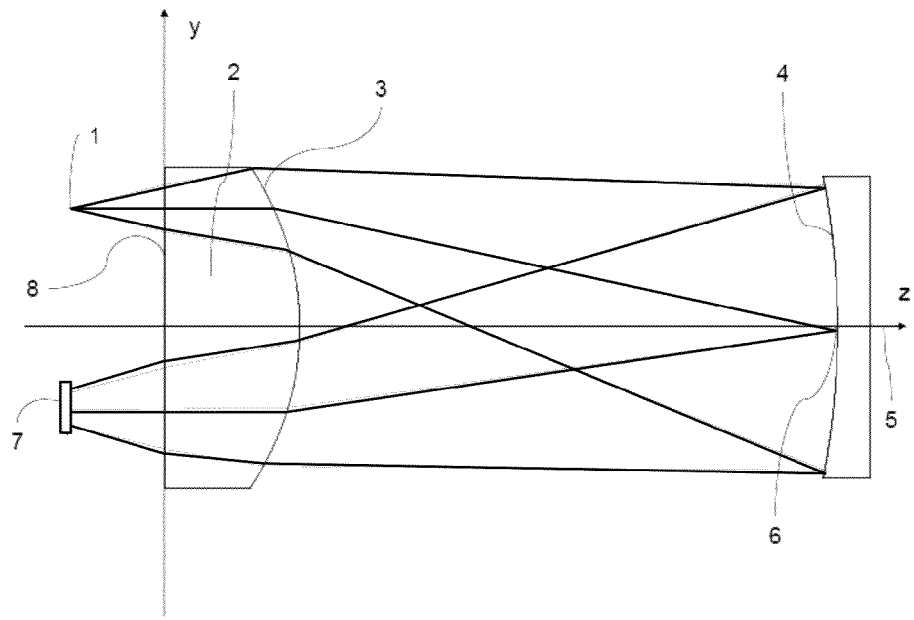
Figure 12:
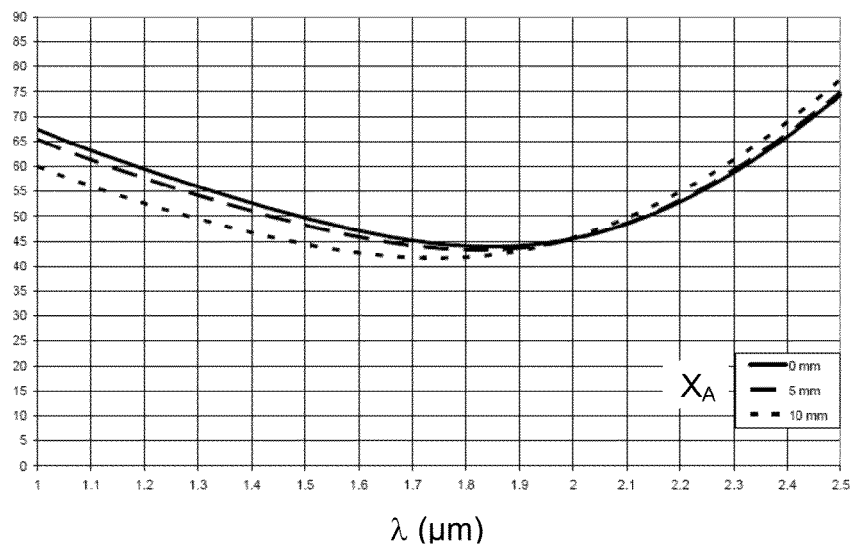
Figure 13:
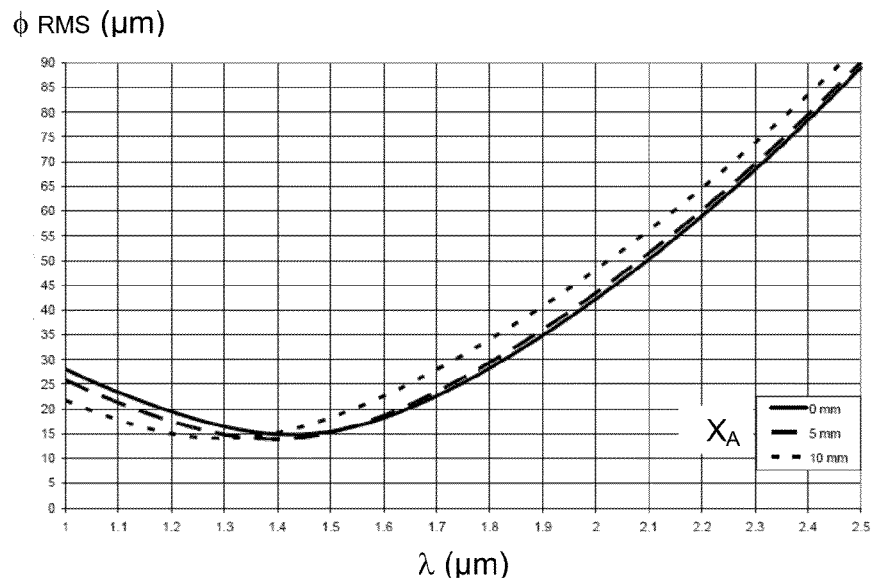
Figure 14:
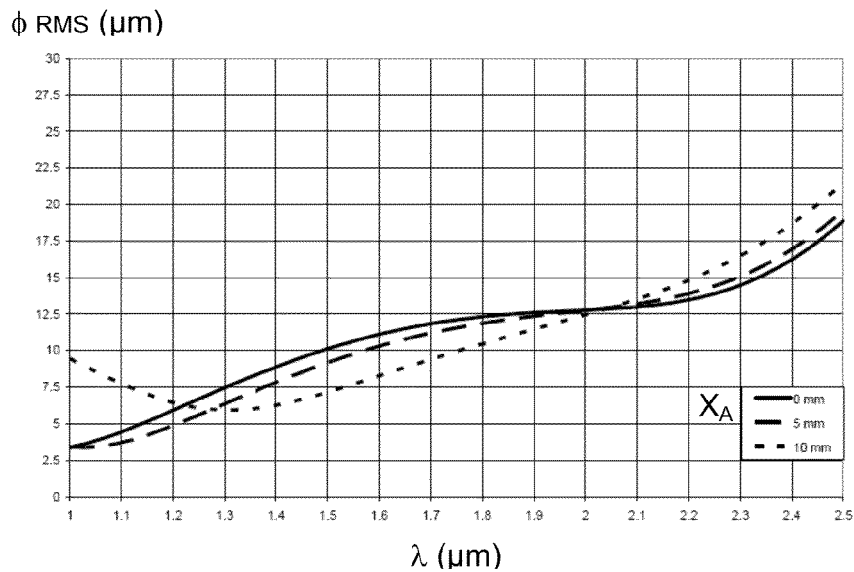

FIG. 3 shows the performance in terms of image quality of a conventional prior art Dyson spectrometer; this graph represents the RMS (root mean square) radius of the image spot of a source point in the image plane or sensor plane; the RMS radius is given for three positions of the source point in the object field (i.e. at three height positions along the entry slit) as a function of the wavelength;

FIG. 4 shows the performance in terms of image quality of a spectrometer of one embodiment of the invention using an aberration-corrected diffraction grating having lines that are no longer strictly parallel and equidistant; this graph represents the RMS radius of the image spot for three positions of the source point in the object field as a function of the wavelength;

FIG. 5 represents diagrammatically the two distortion defects of an imaging spectrometer in the image plane: smile (S) and keystone (K);

FIG. 6 is a sectional view of a Dyson spectrometer modified in accordance with the invention in which the entry port of the spectrometer is on or very close to a plane face of the optical system and in which the image focusing plane (sensor plane) is at a considerable distance from the optical system;

FIG. 7 is a sectional view of an optical system of one embodiment of the invention consisting of a hemispherical lens and a glass plate that may be used in the FIG. 6 spectrometer;

FIG. 8 shows the performance in terms of image quality of a conventional Dyson set-up that would be used with the entry port in the glass of the optical system and the exit port at a distance of 30 mm from the glass;

FIG. 9 shows the performance in terms of image quality of a set-up of one embodiment of the invention comprising a diffraction grating etched on an aspherical (ellipsoidal) support and in which the entry and exit ports are in air at a distance of 30 mm from the optical system;

FIG. 10 shows the performance in terms of image quality of a set-up of another embodiment of the invention comprising a diffraction grating corrected for aberration and etched on an aspherical (ellipsoidal) support in which the entry and exit ports are in air at 30 mm from the optical system;

FIG. 11 is a sectional view of a Dyson spectrometer of another embodiment of the invention comprising a simple plano-convex lens and in which the entry port of the spectrometer (comprising an entry slit or an optical fiber bundle) and the image focusing plane (sensor plane) are at a considerable distance from the lens;

FIG. 12 shows the performance in terms of image quality of a conventional Dyson set-up comprising a spherical concave diffraction grating not corrected for aberration and used with the entry and the exit in air at 30 mm from the lens;

FIG. 13 shows the performance in terms of image quality of a set-up of one embodiment of the invention comprising a concave diffraction grating not corrected for aberration etched on an aspherical (ellipsoidal) substrate and in which the entry and exit ports are in air at a distance of 30 mm from the optical system; and FIG. 14 shows the performance in terms of image quality of a set-up of one embodiment of the invention comprising a concave diffraction grating corrected for aberration etched on an aspherical (ellipsoidal) substrate and in which the entry and exit ports are in air at a distance of 30 mm from the optical system.

To make clear the advantages of the invention, different configurations of spectrometers having the following characteristics in common are compared:

Numerical aperture of the entry beam corresponding to an aperture number in air of F/2: ON=0.2425;

Spectral range: 1000 nanometers (nm) to 2500 nm;

Height of entry slit: 20 mm, which therefore corresponds to the object field;

Magnification: 1, which is the nominal magnification of this type of set-up;

Sensor size: 10 mm in the spectral direction and 20 mm in the spatial direction;

Radius of curvature of grating: 250 mm, which roughly fixes the overall size of the system and the density of the lines of the grating, which here is approximately 30 lines/mm.

Image quality and minimum distortion are the criteria used to evaluate the image quality of the system.

The set-up operates in diffraction order −1 of the grating (diffraction order toward the axis of symmetry of the system).

These fixed conditions make it possible to compare objectively the imaging performance of the different versions of Dyson spectrometers.

It is understood that the present invention is not limited to the optical configuration given in the example and may be extended to any Dyson set-up used in any diffraction order.

FIG. 1 represents a Dyson concentric spectrometer set-up in section in a plane YZ transverse to the principal direction of the lines of the grating. FIG. 2 represents the same spectrometer as FIG. 1 in a plane XZ orthogonal to the plane YZ.

The Dyson spectrometer represented in FIGS. 1 and 2 comprises a plano-convex lens 2 and a concave diffraction grating 4 that is concentric. This Dyson spectrometer comprises an entry slit 1 or an optical fiber bundle in an object plane and an exit port 10 in an image plane 7.

The concave grating 4 has a meridian plane (YZ) passing through its summit 6 and orthogonal to the principal direction of its lines. The lens 2 and the grating 4 have a common optical axis 5 passing through their respective summits and normal to their respective surfaces. The two spherical surfaces 3 and 4 thus have their centers of curvature close together and on the Z axis 5, whence the name concentric spectrometer.

In the embodiment represented in FIGS. 1 and 2, the object plane and the image plane of the spectrometer are situated on the plane face 8 of the plano-convex lens 2, which is hemispherical.

A source point 9 situated on the entry slit 1 emits a polychromatic light beam that enters the lens via its plane face 8 close to or coincident with the entry slit 1; the incident beam is then refracted by the spherical surface 3 of the lens 2 and then reaches the diffraction grating 4 which diffracts by reflection a diffracted beam represented diagrammatically by a set of monochromatic light beams directed toward the lens 2. The diffracted light beam is focused by the lens 2 in the exit image plane 7 at a position 10 relative to the meridian plane (YZ); the luminous spectrum of the diffracted beam is dispersed along the axis y.

The imaging performance of a system of this kind optimized for the parameters indicated above are shown in FIG. 3. Image quality is evaluated by calculating the root means square (RMS) radius of the theoretical image spot obtained by ray-tracing through the system from a source point. This calculation is effected for three points of the field: $X_A=0$ mm (the center of the slit), $X_A=5$ mm (at slit mid-height), and $X_A=10$ mm (at the end of the slit) and for each wavelength of the usable spectrum.

The diameter of the RMS ray is between 3 and 18 µm over the whole of the image field.

In any imaging system distortion is also an important parameter. In an imaging spectrometer the notion of distortion is still important but is complicated by the fact that the spectral dimension is introduced. Thus two distortion defects are referred to, namely smile (S) distortion in the spectral dimension and keystone (K) in the spatial dimension, as shown diagrammatically in FIG. 5. All the set-ups used to illustrate the invention have an overall (smile+keystone) distortion less than or equal to 7 micrometers (µm), which is very low.

The present invention proposes to use a "corrected" diffraction grating 4 instead of the diffraction grating with parallel and equidistant lines on a spherical support used in previous Dyson set-ups. There has long been known in the art the uncorrected concave grating in which the etched lines that constitute it are parallel and equidistant when projected onto the plane passing through the summit 6 of the grating and orthogonal to the axis 5.

In the present document, the expression "corrected grating" refers to a diffraction grating having lines that are not equidistant and parallel, but with a trace that is optimized so that the image quality of the spectrometer is enhanced overall, given not only aberrations of the grating but also those of the optical system between the entry and exit ports.

A first embodiment of the invention relies on the use of a concave diffraction grating 4 the lines (or grooves) of which are neither exactly parallel nor exactly equidistant. The line density and the direction of the lines are slightly modified according to the point on the surface of the grating 4 concerned in order to improve the overall image quality of the spectrometer.

The local density of the lines of the grating and the direction of the lines are optimized numerically to minimize the RMS radius of the image spot at the same time as preserving low distortion in the image field. A grating optimized in this way may be fabricated and replicated by a holographic process in particular.

FIG. 4 shows the performance in terms of image quality of an imaging Dyson spectrometer using such a grating in a first embodiment of the invention in which the plano-convex lens is a hemispherical lens, having its plane face situated on the object plane and on the image plane of the spectrometer.

Comparing FIGS. 3 and 4 shows clearly the improvement in terms of image quality obtained by using a corrected concave grating in a Dyson spectrometer. The size of the image spot (FIG. 4) is decreased on average by 30% relative to the spectrometer in which the grating is one with parallel and equidistant lines on a spherical surface (FIG. 3).

A second particular embodiment of the invention is described below with reference to FIG. 6.

This figure represents diagrammatically a Dyson spectrometer in which the collimation and focusing optical system is modified. The entry 1 of the spectrometer is in or very close to the glass of the lens 2, but what is different is that the exit 11 is situated at a considerable distance from the exit face of the lens; in the present example and the present calculations the distance between the sensor and the glass is 30 mm. The refractive optical system shown in FIG. 7 comprises a relatively thin (plano-convex) lens 12 in contact with a glass plate 13 that lies only on the entry side of the imaging spectrometer. The glass of the plate 13 may be identical to that of the lens 12 or different, for example to make it possible to reduce chromatic aberration.

The gap created in this way at the exit is particularly beneficial if the sensors used and their technology make it impossible to place them in the immediate vicinity of the glass, primarily because of overall size problems. This is the situation in particular for cooled sensors that are generally sealed in an enclosure closed by a transparent porthole and placed at a certain distance from the sensitive surface, thereby preventing placement of the sensitive surface in the immediate vicinity of the lens 2. The optical system represented in FIG. 7 thus facilitates the use of this kind of sensor.

The FIG. 8 curves show the performance in terms of image quality of an imaging spectrometer having a grating of parallel and equidistant lines on a spherical medium, the spectrometer comprising the optical system represented in FIG. 7, with the entry in (or very close to) the glass and the exit in air at a distance of 30 mm from the exit face of the lens. The performance shown in FIG. 8 is much degraded relative to the previous situation in which the entry and the exit are in the glass (FIG. 3 and FIG. 4). The RMS radius of FIG. 8 is of the order of 30 µm throughout the spectrum and for the three image points of the entry slit.

The second embodiment of the invention uses a diffraction grating etched on an $$h(r) = \frac{r^2/R}{1 + \sqrt{1 - (1+k)\left(\frac{r}{R}\right)^2}}$$

y aspherical surface can be produced by existing oidal type. The substrate retains symmetry of e aspherical profile of revolution is given by the
where h is the elevation;
  R is the radius of curvature;
  r is the radial position of the point concerned relative to the center 6;
  k is the cone constant;
  for an ellipse $-1<k<0$; for $k=0$ it is a sphere.

In one example of the second embodiment the substrate of the diffraction grating is aspherical with a radius of curvature of 250 mm and cone constant $k=-0.125$. This grating makes it possible to produce an imaging spectrometer having its exit in air at 30 mm from the glass (FIG. 6) having the imaging performance shown in FIG. 9. The RMS radius is reduced in particular for wavelengths between 1 and 2 micrometers. This second embodiment thus makes possible a considerable improvement of image quality compared to the spectrometer evaluated in FIG. 8.

A third embodiment of the invention is an improvement on the second embodiment. The spectrometer comprises an optical system as described with reference to FIG. 6, with entry 1 in the glass and exit 11 in air at 30 mm from the glass. In this improvement the diffraction grating is etched on an aspherical substrate corrected for aberration to optimize the overall image quality of the spectrometer.

FIG. 10 shows the imaging performance of a spectrometer of this third embodiment with a diffraction grating with lines that are not exactly parallel and not exactly equidistant etched on an aspherical substrate of ellipsoidal type having the cone constant k=−0.139. The RMS radius is less than 15 micrometers for all wavelengths (from 1 to 2.5 μm) and throughout the image field (source point of 0 to 10 mm).

The image quality (see FIG. 10) of a system of the third embodiment, which uses a diffraction grating corrected for aberration and etched on an aspherical substrate, is even better than that of the second embodiment shown in FIG. 9.

It is interesting to note that a spectrometer conforming to the third embodiment virtually rivals in terms of image quality a spectrometer having the entry and the exit in (or very close to) the glass. The invention thus allows flexible use of the Dyson set-up by allowing the introduction of a large air gap at the exit (first embodiment, of performance that is shown in FIG. 4).

Fourth and fifth embodiments of the invention are described below with reference to FIGS. 11 to 14.

The imaging spectrometer is used as shown diagrammatically in FIG. 11. The entry 1 and the exit 7 of the imaging spectrometer are here in air at a considerable distance (approximately 30 mm) from the plane face of the lens 2. The lens 2 is a plano-convex lens much thinner than a hemispherical lens and therefore of lower cost and less heavy.

FIG. 12 shows a graph representing the image quality of a spectrometer using a spherical concave diffraction grating with parallel and equidistant lines and a plano-convex lens having its entry and its exit at a distance of 30 mm. The RMS radius is between 45 and 80 micrometers throughout the spectral range in the image field. The image quality of such a device is very degraded compared to all the other results referred to above.

In a fourth embodiment, the spectrometer uses a conventional concave diffraction grating etched on an aspherical substrate, and more particularly on an ellipsoidal surface of revolution, with the cone constant k=−0.248. The FIG. 13 graph represents the image quality of a spectrometer of this fourth embodiment. The RMS radius is reduced by a factor of 2 (compared to FIG. 12), especially for wavelengths between 1 and 2 micrometers. Thus changing to an aspherical grating substrate significantly improves performance (compared to FIG. 12 and FIG. 13).

In a fifth embodiment, the spectrometer uses a concave diffraction grating corrected for aberration etched on an aspherical substrate, more particularly on an ellipsoidal surface of revolution, with a cone constant k=−0.260. The FIG. 14 graph represents the image quality of a spectrometer of this fifth embodiment. The aspherical substrate and correction of aberrations allow a spectacular improvement in the imaging performance of the spectrometer of this fifth embodiment of the invention. The performance shown in FIG. 14 gets close to that of the best spectrometers described above (FIG. 3) despite the distance of 30 mm between the entry-exit plane and the plane face of the lens 12.

The fourth and fifth embodiments of the invention propose an imaging spectrometer with improved imaging performance.

The fourth and fifth embodiments offer an interesting alternative to the conventional Dyson spectrometer in which the entry slit and the exit plane must be very close to the plane face 8 of the lens 2.

The invention makes it possible to improve the imaging of a Dyson spectrometer for applications in spectral or hyperspectral imaging by using a diffraction grating that is corrected for aberration and/or that has a substrate of a shape that is aspherical.

A diffraction grating corrected for aberration is a grating in which the lines are no longer exactly parallel and equidistant over the whole of the surface of the component and in which the trace of the lines is optimized to improve image quality (to approximate a system in which the image of a point is a point) of the spectrometer throughout the image field at the same time as minimizing distortion in the spectral and spatial dimensions of the image field.

The various embodiments of the invention make it possible to improve an imaging spectrometer by the combined use of refractive and diffractive elements optimized for an imaging function of good optical quality and low distortion in the spectral and spatial dimensions.

The present invention provides not only an improvement to the image quality of a Dyson spectrometer but also a possible new use of this type of spectrometer with entry slit and/or sensor in air at a significant distance from the lens. This distance provides more room at the entry and at the exit for placing the source and the imaging sensor. This configuration also makes it possible to use a refractive component much more compact than a hemispherical lens used in prior art Dyson spectrometers.

The use of a grating with non-parallel and non-equidistant lines in a Dyson spectrometer is particularly beneficial for spectral or hyperspectral imaging. In an improvement of the invention, the grating is fabricated on an aspherical support that allows further improvement of the imaging qualities of the spectrometer.

The invention claimed is:

1. A Dyson imaging spectrometer comprising:
an entry port (1) extending in a direction X in an object plane of the spectrometer, said entry port being adapted to emit an incident light beam;
a diffraction grating (4) comprising a set of lines on a concave support;
an optical system comprising a hemispherical lens (2), said lens comprising a plane first face (8) and a convex second face (3), the convex face (3) of the lens and the concave face of the diffraction grating (4) being concentric, said optical system being adapted to receive the incident light beam and to direct it toward the diffraction grating (4), to receive a beam diffracted by the diffraction grating, and to form a spectral image of said diffracted beam, said spectral image lying in an image field in an image plane of the spectrometer; and
an exit port in the image plane (7) of the spectrometer adapted to receive an image of the entry port spatially resolved in a first direction and spectrally resolved in a second direction;
characterized in that:
said diffraction grating comprises a set of non-parallel and non-equidistant lines and/or the support of the diffraction grating is aspherical in order to improve the image quality of the spectral image in the image field at the same time as minimizing spectral and field distortion,
and in that the optical system comprises a plate (13) with plane and parallel faces, said plate (13) lying against the plane face (8) of the lens (2) and being disposed on the optical path of the incident beam between the entry port and the diffraction grating, the object plane of the spectrometer being situated on one face of the plate (13) and the image plane of the spectrometer being separated from the lens (2) by a gap.

2. An imaging spectrometer according to claim 1, characterized in that the diffraction grating comprises a set of non-parallel and/or non-equidistant lines adapted to form a spectral image in an image field of improved image quality in the image field at the same time as maintaining low spectral and field distortion.

3. An imaging spectrometer according to claim 1, characterized in that the concave surface of the diffraction grating is an aspherical surface of revolution.

4. An imaging spectrometer according to claim 3, characterized in that the concave surface of the diffraction grating is an ellipsoidal surface of revolution.

5. An imaging spectrometer according to claim 1, characterized in that the materials of the lens (2) and the plate (13) are chosen to compensate chromatic dispersion over the image field.

6. An imaging spectrometer according to claim 1, characterized in that the lens (2) is a thin plano-convex lens and the object and image planes of the spectrometer are separated from the plane face (8) of the lens (2) by a gap of optical thickness typically less than or equal to 15% of the radius of curvature of the grating (4).

7. An imaging spectrometer according to claim 1, characterized in that it comprises a matrix sensor disposed in the image field to form a spectral image of the entry port.

8. An imaging spectrometer according to claim 1, characterized in that it comprises an enclosure comprising a sensor and a window, the sensitive surface of the sensor being placed behind said window and said enclosure being adapted to cool said sensor.

9. An imaging spectrometer according to claim 1, characterized in that the entry port comprises a set of optical fibers aligned with an axis and the sensor is adapted to form an image spectrum of each optical fiber.

10. An imaging spectrometer according to claim 2, characterized in that the concave surface of the diffraction grating is an aspherical surface of revolution.

11. An imaging spectrometer according to claim 10, characterized in that the concave surface of the diffraction grating is an ellipsoidal surface of revolution.

12. An imaging spectrometer according to claim 2, characterized in that the lens (2) is a thin plano-convex lens and the object and image planes of the spectrometer are separated from the plane face (8) of the lens (2) by a gap of optical thickness typically less than or equal to 15% of the radius of curvature of the grating (4).

13. An imaging spectrometer according to claim 2, characterized in that it comprises a matrix sensor disposed in the image field to form a spectral image of the entry port.

14. An imaging spectrometer according to claim 2, characterized in that it comprises an enclosure comprising a sensor and a window, the sensitive surface of the sensor being placed behind said window and said enclosure being adapted to cool said sensor.

15. An imaging spectrometer according to claim 2, characterized in that the entry port comprises a set of optical fibers aligned with an axis and the sensor is adapted to form an image spectrum of each optical fiber.

* * * * *